United States Patent
Beinhofer et al.

(10) Patent No.: US 12,109,700 B2
(45) Date of Patent: Oct. 8, 2024

(54) OPTIMIZATION METHOD FOR IMPROVING THE RELIABILITY OF GOODS COMMISSIONING USING A ROBOT

(71) Applicant: TGW Logistics Group GmbH, Marchtrenk (AT)

(72) Inventors: Maximilian Beinhofer, Thalheim bei Wels (AT); Alexander Balasch, Wels (AT); Harald Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 598 days.

(21) Appl. No.: 17/289,887

(22) PCT Filed: Nov. 20, 2019

(86) PCT No.: PCT/AT2019/060395
§ 371 (c)(1),
(2) Date: Apr. 29, 2021

(87) PCT Pub. No.: WO2020/102840
PCT Pub. Date: May 28, 2020

(65) Prior Publication Data
US 2021/0402595 A1    Dec. 30, 2021

(30) Foreign Application Priority Data
Nov. 21, 2018 (AT) .................................. 51021/2018

(51) Int. Cl.
*B25J 9/16* (2006.01)

(52) U.S. Cl.
CPC ........... *B25J 9/1612* (2013.01); *B25J 9/1653* (2013.01); *B25J 9/1687* (2013.01); *B25J 9/1697* (2013.01)

(58) Field of Classification Search
CPC ...... B25J 9/1612; B25J 9/1653; B25J 9/1687; B25J 9/1697; B25J 9/1679; B25J 9/163;
(Continued)

(56) References Cited

U.S. PATENT DOCUMENTS 5,041,907 A     8/1991  Sager et al.
9,492,923 B2 *  11/2016  Wellman ................ B25J 9/1612
(Continued)

FOREIGN PATENT DOCUMENTS

| WO | 2016/100235 A1 | 6/2016 |
| WO | 2018/017612 A1 | 1/2018 |
| WO | 2018/140746 A1 | 8/2018 |

OTHER PUBLICATIONS

International Search Report in PCT/AT2019/060395, mailed Apr. 9, 2020.
(Continued)

*Primary Examiner* — Rachid Bendidi
(74) *Attorney, Agent, or Firm* — Collard & Roe, P.C.

(57) ABSTRACT

An optimization method improves article pickup and discharge reliability in a picking process using a robot. An article is picked-up from or out of a first load carrier and is placed in or on or dropped into or onto a second load carrier by a gripping unit on the robot head. In an image processing step, a gripping pose for the gripping unit is calculated for picking-up the article by determining at least one dimension from a captured image and by determining a range allocation by comparing with dimension ranges. Using a confidence value, a dimension value is determined, from stored article reference data or from a normalization value of the dimension range and allocated to the determined dimension. In a preparation step, a mathematical scattering measure function is applied for the determined dimension and dimension
(Continued)

ranges, and normalization and confidence values of the dimension ranges are determined therefrom.

24 Claims, 3 Drawing Sheets

(58) Field of Classification Search
CPC .. B65G 2203/0258; G05B 2219/40564; G05B 2219/31313; G05B 2219/39571; G05B 19/4183; Y02P 90/02
See application file for complete search history.

(56) References Cited

U.S. PATENT DOCUMENTS

| | | |
|---|---|---|
| 9,926,138 B1 * | 3/2018 | Brazeau .................. B25J 5/007 |
| 10,023,393 B2 * | 7/2018 | Brazeau ................. B65G 31/00 |
| 2018/0215545 A1 | 8/2018 | High et al. |

OTHER PUBLICATIONS

Causo Albert et al. "A Robust Robot Design for Item Picking", 2018 IEEE International Conference on Robotics and Automation (ICRA), May 21-25, 2018, pp. 7421-7426.

Paraschidis K et al. "A robotic system for handling textile and non rigid flat materials", Computers in Industry, Elsevier, vol. 26, No. 3, (Aug. 1, 1995), pp. 303-313.

\* cited by examiner

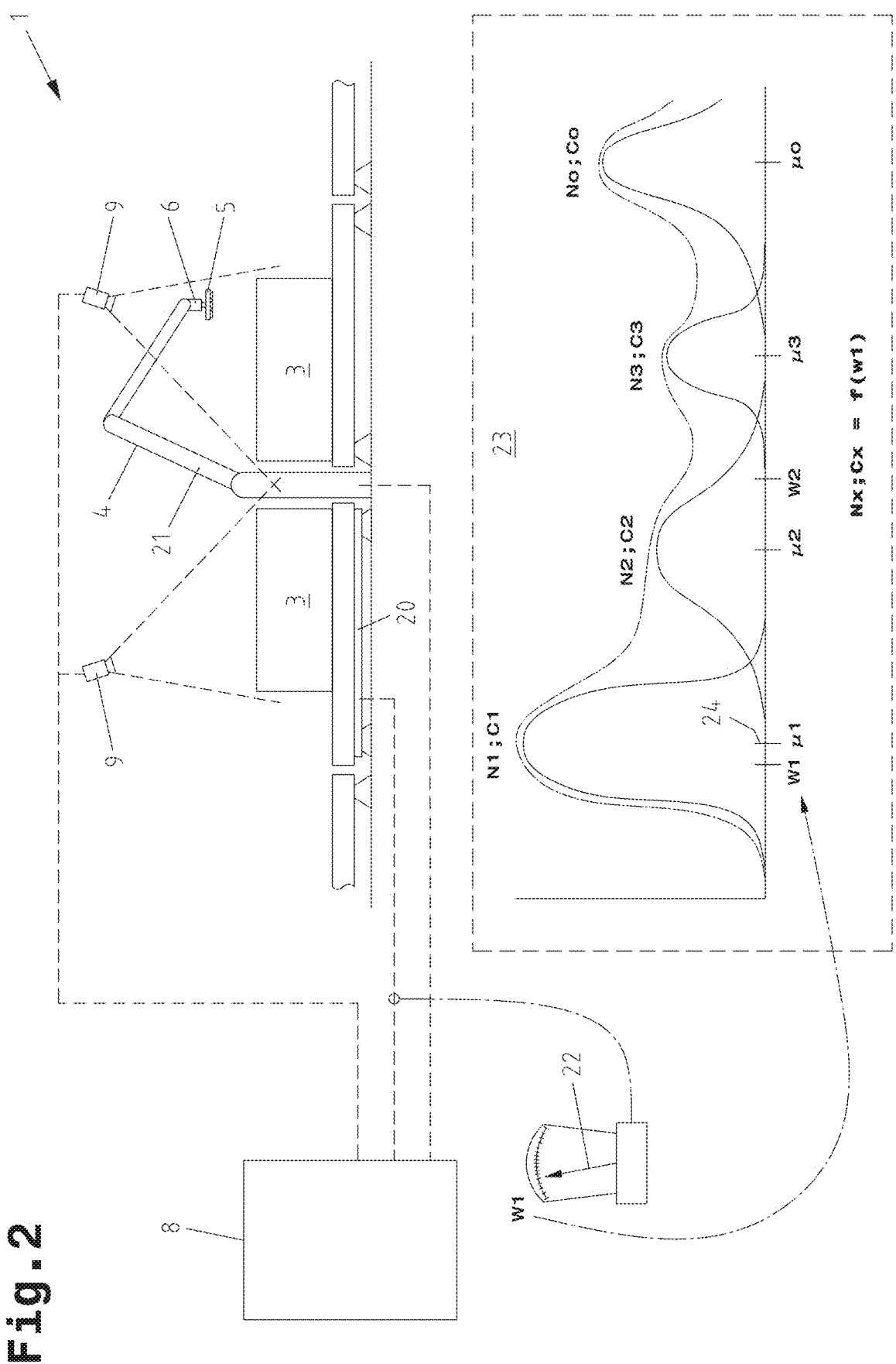

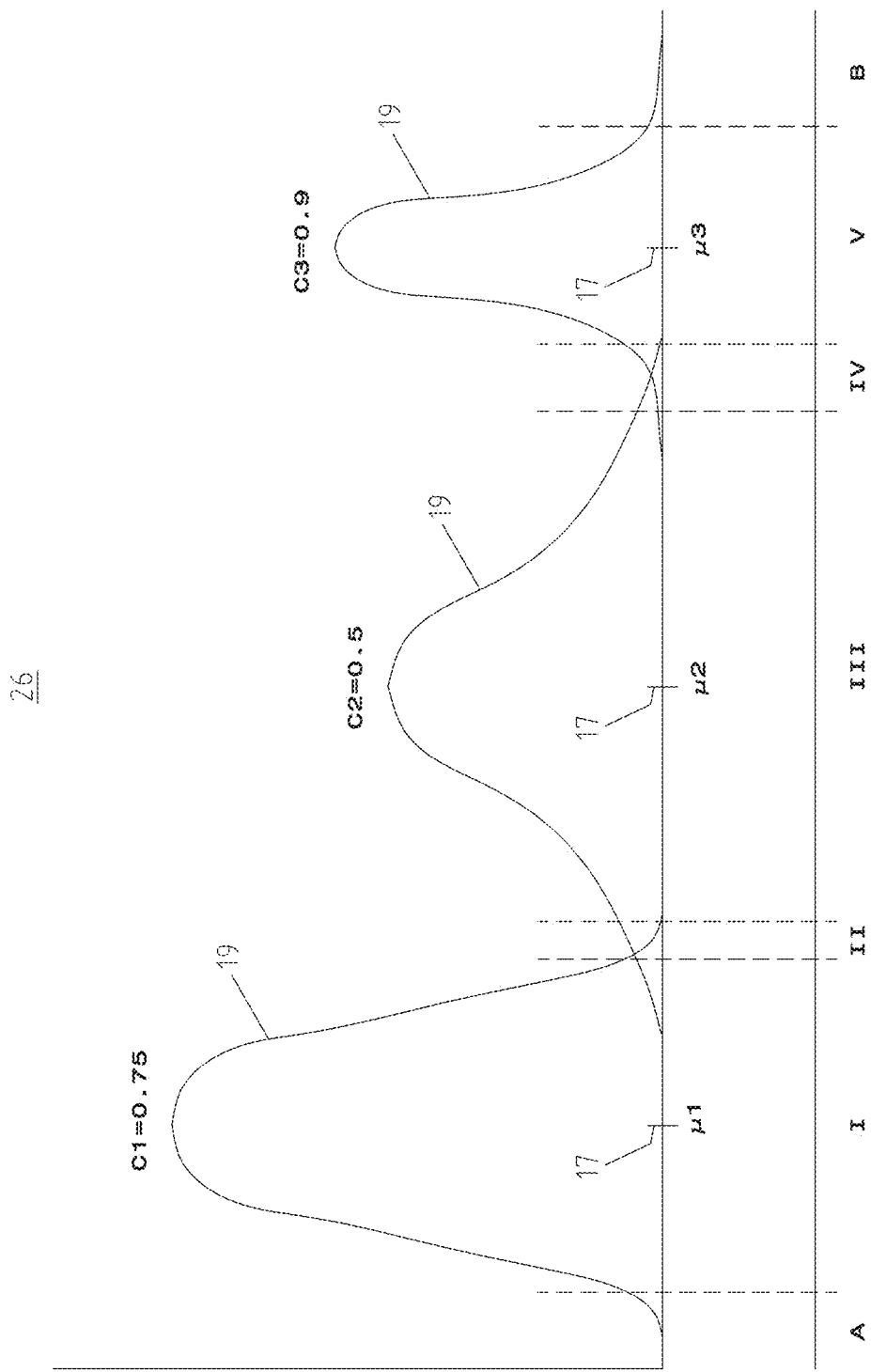

OPTIMIZATION METHOD FOR IMPROVING THE RELIABILITY OF GOODS COMMISSIONING USING A ROBOT

CROSS REFERENCE TO RELATED APPLICATIONS

This application is the National Stage of PCT/AT2019/060395 filed on Nov. 20, 2019, which claims priority under 35 U.S.C. § 119 of Austrian Application No. A 51021/2018 filed on Nov. 21, 2018, the disclosure of which is incorporated by reference. The international application under PCT article 21(2) was not published in English.

BACKGROUND OF THE INVENTION

1. Field of the Invention

The invention relates to an optimization method for improving the reliability of a pickup and discharge of articles according to an order in a picking process using a robot and a workstation.

2. Description of the Related Art

To increase the picking performance, monotonous and tedious picking tasks are increasingly executed in an automated manner by a robot system. However, to allow for such a robot system to reliably fulfill an order, in particular a picking order, it is required that relevant article parameters are present in a high level of reliability. In the present context, the robot has a gripping unit and executes the article manipulation as well as the associated controller are understood as the robot system. Article parameters are understood as at least one dimension of the outer packaging and/or the article weight in the present context.

When an order is being fulfilled, a robot system beforehand needs information on the number of articles to be loaded from the source load carrier into the target load carrier and on how the article is to be picked-up from the source load carrier (and optionally how the article is to be discharged in the target load carrier). During picking, it must be checked by the robot system how many further articles are to be reloaded to fulfill the order. When articles are at predefined positions on and/or in the load carrier, a robot may move to one of these positions and reliably pick-up an article. However, if the articles are present in a random, loose arrangement, it must be determined in a first step where in/on the load carrier the article to be picked-up is. This is explicitly understood to mean that the article which can be best picked-up is determined from a possible plurality of articles that can be picked-up. Usually, image processing methods are used for this purpose so as to identify possible candidates for pickup by the robot in an image of the load carrier. During image processing an attempt is therefore, for example, made to find the article boundaries in the captured image in order to determine a possible gripping position within these boundaries. Depending on the outer shape of the articles (carton, polybag, etc.), these boundaries may possibly be difficult to detect, especially if the articles are densely arranged on/in the load carrier. To improve the detection of the boundary/the edge of an individual article, the dimensions of the outer article packaging may be adduced to allow for a plausibility check to be executed during image processing. Hence, for example, gripping positions, for which an edge length (the length of a determined article boundary) has been determined that cannot be formed by an individual article, may be precluded.

For correct processing of the order, it is moreover of decisive importance that the correct number of articles is transferred. In case of articles that can be gripped well (articles with unambiguous gripping positions), the robot predominantly picks-up merely one article during article pickup. However, articles which for example have an irregular outer shape and in particular also polybags are to be picked, too. Polybags are understood as articles—often textiles—in an outer packaging of a soft plastic film. In such an article class, during pickup by the robot, it can happen that more than one article is picked-up-which must in any case be recognized in order to prevent a picking error. The recognition of the picked-up articles is for example realized via the article weight, by the picked-up weight and/or a change in weight of the source and/or target load carrier being captured.

Thus, the reliability of picking depends on article parameters which may well be subjected to fluctuations due to their origin. These parameters are usually manually determined at the article receipt area in the course of reference data entry and stored in the warehouse management system (WMS) as article reference data, preferably along with other article data such as an article number. Since personnel usually have little knowledge of the importance of correctly recording these parameters, the recorded parameters often cannot provide the accuracy required for reliable manipulation by a robot. Moreover, a manufacturer can change the outer packaging and/or the article weight during a special offer period without changing the article number. Since the article number remains unchanged, such a change is not recognized at the article receipt area, however, suddenly leads to partially massive problems during automatic picking, since the entered and/or used article parameters are no longer correct and thus incorrect pickups due to wrong positioning of the gripper unit will increase. Moreover, errors may occur when the recorded number is determining, since the weight comparison suddenly displays incorrect recordings. Besides these changes by a considerable amount, article reference data is usually also subject to slight fluctuations, which, however, may cause malfunctions in an automated process and thus reduce the throughput of the picking system.

SUMMARY OF THE INVENTION

The present invention is based on the object of designing a picking process and a workstation with a robot such that the picking performance becomes independent of slight and considerable fluctuations of article parameters.

The object of the invention is achieved by an optimization method for improving the reliability of a pickup and discharge of articles according to an order. The order is processed by a robot in a picking process, wherein the robot has a robot head movable relative to a robot base and comprises a gripping unit. When the order is processed, an article is picked-up from or out of a first load carrier and is placed in or on or dropped into or onto a second load carrier by means of the gripping unit. Such a load carrier may be formed by a loading aid. Preferably, both load carriers are formed by loading aids. The loading aid is for example a container, a carton or a tray. Thus, the articles are provided in a first loading aid, and are assembled in a second loading aid. However, the load carrier may also be formed by a conveying means, for example a conveyor belt, of a conveying device. In this embodiment the articles are provided directly on a conveying surface of the conveying device. In an image processing step, a gripping surface size and a gripping surface pose are determined by an opto-sensory preparation and analysis system, and a gripping pose for the gripping unit is calculated therefrom. After this, the gripping unit is moved to the calculated gripping pose and the article is picked-up by the gripping unit.

According to the invention, at least one dimension of the article is determined in the image processing step when the gripping surface size is determined and a range allocation is determined by comparing the dimension of the article with dimension ranges. In this context, the dimension ranges are stored in a parameter data field. For this range allocation, a dimension value is determined and is allocated to the determined dimension. This allocation is executed depending on a confidence value of a dimension range, wherein the dimension value is selected either from stored article reference data or from a normalization value of the dimension range. The normalization value and the confidence value of the dimension range are also stored in the article parameter field.

Moreover, in a preparation step, a mathematical scattering measure function is applied for the determined dimension and for the dimension ranges, and normalization values and confidence values of the dimension ranges are determined therefrom.

The particular advantage of this embodiment consists in that the gripping surface size and the gripping surface pose can always be determined with a high degree of reliability. Articles to be picked can be subject to slight fluctuations regarding their dimensions and their outer packaging. Moreover, special packaging can also occur, which despite the same article marking, have a different outer packaging-sometimes even a significantly different outer packaging. Without the presently described method, the dimensions may be determined incorrectly during image processing, such that the gripping surface size and/or the gripping surface pose are determined incorrectly or at least inaccurately. This subsequently results in problems during pickup by the gripping unit of the robot and thus immediately in an error in processing the order.

The normalization value is understood as the value determined in the preparation step from the dimensions determined in the image processing step. Without limiting further embodiments, in a very simple case, this may be an arithmetic mean value. In further embodiments according to the invention, other methods for forming the normalization value are provided. To determine the at least one dimension, an optical image capturing means, which is connected to the opto-sensory preparation and analysis system, creates an image of the articles in or on the first load carrier. This image capturing means may for example be a CCD camera. According to a preferred embodiment, the image capturing means is formed by a 3D stereo camera, which besides the optical image also provides a point cloud of distance values. Moreover, multiple image capturing means can be used, too.

Besides the dimensions, the article weight may also be subject to fluctuations. According to a further embodiment, it is thus provided that in a counting step following the pickup of the article by the gripping unit, a numeric quantity of picked-up articles is determined. In this regard, an article weight is determined by the weighing device and compared with weight ranges and a range allocation is determined. The weight ranges are also stored in the parameter field. For said weight allocation, a number value is determined, wherein depending on a confidence value of a weight range, the number value is selected from stored article reference data or from a normalization value of the weight range. The normalization value and the confidence value of the weight range are also stored in the article parameter field. Subsequently, in the preparation step for the article weight and for the weight ranges, a mathematical scattering measure function is applied, and normalization values and confidence values of the weight ranges are determined therefrom.

Particularly in the case of article weight, there may be greater scattering. For example, a manufacturer may change the filling quantity during a special offer period, without the outer packaging and/or the article number being changed. Without the method according to the invention, picking errors would occur, since suddenly a stored reference data weight no longer matches the determined weight and a picking quantity can no longer be determined correctly. By the advancement according to the invention, a very quick adaptation to the deviating weight is possible, such that the picking process is not or just slightly disturbed.

The particular advantage of the method consists in that slight fluctuations of physical article parameters such as outer dimensions and weight, but also a (temporary) significant deviation from standard values, are detected by the adaptive method. Hence, further processing can be adapted to the changed article parameters and thus erroneous picking may be prevented.

One advancement consists in that alternatively to comparing the determined article weight with weight ranges, a quotient is calculated from the article weight determined by the weighing device and a normalization value of the weight, wherein the quotient is scaled and compared with weight ranges, and a range allocation is determined. This advancement advantageously creates a simple possibility of directly deriving the number of articles picked-up by the gripping unit from the determined article weight. According to this embodiment, the integer value directly corresponds to the number of picked-up articles. By evaluating the decimal places, the scatter of the determined weight and a reliability of the determined article weight can be concluded. The smaller the difference of the decimal place to the closest integer value, the more accurately the determined article weight corresponds to the normalization value of the weight and/or a multiple thereof. If the integer value is greater than one, the quotient is scaled to the weight range corresponding to the integer value of the quotient and the evaluation of the decimal places is executed for this weight range again.

According to an advancement, it is also provided that the weighing device is arranged separately from the robot, in particular from the gripping unit, and acquires the weight of the first article carrier, and that the counting step is executed before the discharge of the articles, in particular after pickup of the articles from or out of the first load carrier and before the gripping unit reaches the second load carrier. This embodiment entails the advantage that the determination of the number of picked-up articles is executed very shortly after the pickup from or out of the first load carrier. Hence, it is possible to react quickly in the event of an erroneous pickup, in particular before a possible erroneous discharge into the second load carrier occurs. In a preferred embodiment, the weighing device is arranged such that the weight of the entire first load carrier is determined. The picked-up article weight is thus determined as a difference weight of the first load carrier before and after picking-up the articles. When the robot, in particular the gripping unit, picks-up the article and moves away from the load carrier, an acceleration of the article occurs. If the weighing device is arranged on the robot, in particular on a robot arm, this acceleration is detected as additional weight. Therefore, a weighing device arranged separately from the robot, in particular separately from the robot arm, has the advantage of preventing falsification of the article weight due to the acceleration of the article. Thus, a correction of the overlapping weight proportions and/or a movement pause of the robot are not required for weight measuring.

One advancement also consists in that, in case of a determined number value which is greater than one, an examination is executed as to whether the determined number value exceeds the target quantity of articles to be picked, wherein the target quantity is stored in the order, and in case of exceedance, a special handling step is executed. In general, it is provided in robot-supported automated picking systems that only one piece of an article is picked-up by the gripping unit at a time, wherein this process is executed until the total number of articles to be picked-up has been transferred. Due to the arrangement of the articles in or on the source load carrier, it can sometimes happen that the gripping unit picks-up more than one article. It is essential for successful picking that the total number of articles picked-up so far does not exceed the number of articles to be picked. With this further advancement, it is now checked whether the picking quantity has been exceeded in the case of multiple articles and a special handling step is then executed for this case.

It is further provided that in case of exceeding a limit value of the number value, or in case of exceeding a range limit value during the determination of the range allocation, a special handling step is executed. There may be situations where articles get caught, or where multiple articles stick together, which means too many articles are picked-up by the gripping unit. According to a preferred embodiment, the present method is directed towards tolerating an erroneous pickup of up to three articles. It should be noted that the method is not limited to this number. If the determined article weight is higher than can be covered by the stored weight ranges, it is assumed that an undefined number of articles or a wrong article has been picked-up. In this case, the picking operation may not be executed and the special handling is triggered.

One advancement consists in that the normalization value of the weight is calculated by means of a mathematical weighting function from all normalization values of the weight ranges. By considering all normalization values of the weight ranges (in example 3) according to the formula $$\hat{\omega} = \frac{1}{3}\left(\mu_1 + \frac{\mu_2}{2} + \frac{\mu_3}{3}\right)$$

all individual normalization values ($\mu$) provide a weighted contribution to the determined weight of an individual article. It should expressly be noted that other mathematical weighting functions may also be used for calculating the normalization value of the weight.

According to a further possible embodiment, it is provided that a range classification is performed for the decimal value of the quotient, wherein for a first range the number value is determined by the integer part of the quotient, and for a second range a special handling is performed. The decimal value of the quotient provides a direct indication to the deviation from the normalization value of the article(s) currently held by the gripping unit. Particularly where more than one article has been picked-up, the weight tolerances of the articles overlap and may also overlap such that the decimal value falls into a weight range which is outside the weight range of the corresponding integer part. Thus, an unambiguous determination of the integer value is not possible anymore and a special handling is performed. Around each integer part there is a first range in which the fluctuation range of the recorded values (dimension and weight) can be unambiguously allocated to the integer part. Where multiple articles are picked-up, however, it can happen by chance that the fluctuation ranges overlap so unfavorably that the decimal value lies in a second range. In this case, it cannot be reliably guaranteed that the determined normalization value corresponds to the actual number of articles at the gripping unit. For example, it may be checked by means of the special handling whether by selection of the closest (other) normalization value, and caused thereby, another distribution of the first and second range of the decimal value, an unambiguous allocation may be achieved. In case of selection of the closest normalization value, the decimal value may then be the first range and hence allow for an unambiguous allocation.

A further embodiment of the present method consists in that for a third range, the confidence values of two adjoining weight ranges are analyzed and the article weight is determined from the normalization value of the weight range with the higher confidence value. However, the weight tolerances of the article weights may for example also overlap such that the quotient and/or the decimal proportion is precisely in the transition region of the weight ranges. According to the advantageous advancement, the confidence value of the two weight ranges are compared and the article weight is determined based on that weight range which has the higher confidence value. The confidence value provides an indication on the quality of the allocation of weight values to value ranges. The higher the confidence value, the more reliably a specific determined article weight belongs to a weight range. This advancement thus increases the reliability of the determination of the article weight, since a more improbable allocation is excluded due to the consideration of the confidence value.

In this respect, according to an advancement, it is also provided that during the determination of the range allocation, a check is executed as to whether the determined dimension is in an overlap region of two dimension ranges. In the case of a positive check, a special handling step is performed. The articles arranged in or on the first load carrier may, for example, have an outer packaging in which at least two dimensional components differ only slightly from one another. In the image processing step, it is therefore possible that a dimension is determined that lies in the transition region of two possible dimension ranges and cannot be allocated unambiguously. In order to be able to reliably complete the order, it is therefore intended to resolve this ambiguity in a special handling step.

According to an embodiment, it is provided that in case of a determined position of the dimension in the overlap region, the image processing step is executed again in the special handling step. One possibility to resolve an ambiguous allocation of a determined dimension to a dimension range is to determine the dimension again. It is thus preferred for a new image to be captured by an image capturing means and to execute the individual steps of image recognition again. When re-capturing an image, there may, for example, be different light conditions and/or the image recognition will choose a different starting point, whereby the method steps of the image recognition have a different, and possibly unambiguously allocatable, result for the dimension. This step may also be executed once more or multiple times more, possible with activated lighting means to create an increased contrast for the image recognition.

A further possible special handling consists in that in the special handling step, the robot is controlled to move the robot head to the first load carrier and to pick-up an article and to place the article again and that subsequently, image processing is executed again. In case that during image processing step no unambiguous dimension value can be determined, the creation of a more favorable initial situation for the image recognition by transferring an article in the first load carrier may be provided according to this advancement. Due to the transfer, the arrangement of the articles in the first load carrier will change, supplying a newly captured image to image processing. This step may also possibly be executed multiple times.

A further possible embodiment of the special handling consists in that in the special handling step, the robot is controlled to move the robot head to the first load carrier and to place or drop the picked-up article on/onto or in/into the first load carrier and that image processing is executed again. If it is impossible to unambiguously allocate the determined weight to a weight range, it is advantageous with respect to a reliable execution of the order to place the picked-up article (and/or the picked-up articles) back into or onto the first load carrier and to subsequently restart the entire method. Placing the picked-up article back into the first load carrier leads to a change in the arrangement of the articles in or on the load carrier, whereby a new starting point is created for the method steps (image processing, preparation and counting step) subsequently executed anew.

According to an advancement, it is further provided that in the preparation step, for the allocated range, the normalization value is defined as the mean value of a normal distribution. This embodiment is a possibility to obtain a reliable value for the respective parameter from the determined values for the article weight and/or for the determined dimension values. The individual values of measurement series of physical quantities such as the weight and/or the dimension are subject to mostly slight, random fluctuations. The individual values, however, will accumulate around a mean value and great deviations from this clustering value will be rather rare. Such a measuring result can be interpreted as a normal distribution, for which a mathematical model for calculation exists, with which the normalization value can be determined as a mean value of the normal distribution.

An advantageous advancement particularly consists in that the mathematical scattering measure function comprises an expectation-maximization algorithm and iteratively groups determined values, dimensions and/or weight values into local clusters. In a random process, which the determination of dimension values and/or weight values can be considered to be, it may always happen that a determined value deviates significantly from the mean clustering value. In the present case, where multiple possible and value dimension and/or weight values exist, it can thus occur that a scattering value falls into the range of another clustering value and would thus be wrongly added to it. With the present advancement, an iterative process is performed, which attempts to group the individual determined values into local clusters (clustering) to thus obtain a better result for which local clustering value the measurement values belong to. As the mathematical theory regarding this method is per se known, it is not further elucidated here.

It should be noted that for the description of the mathematical methods, the terms measurement value and determined value are used synonymously.

An advancement also consists in that a probability distribution, in particular a normal distribution, is applied to the grouped values, and that for local clusters, a mean value and a mean value scatter are determined and the mean value is defined as the normalization value. A normal distribution is applied to each of the local clusters iteratively determined by the expectation-maximization algorithm in order to minimize the mean value scatter by means of the iterative variation.

In this regard, an advantageous advancement is characterized in that the mathematical scattering measure function comprises a sum of weighted normal distributions (mixture of Gaussians) and groups values, dimensions and/or weight values iteratively into local clusters.

Weighted normal distributions, in particular mixed models, are a probability model for representing normally distributed partial results within a total quantity of results. In order to learn the model from the partial results, the expectation-minimization algorithm is used, which, in an expectation step, alternately allocates the partial results to the different normal distributions and, in a maximization step, based on the allocations made, optimizes the parameters of the normal distributions.

An advancement further consists in that, in an adaptation step, the dimension ranges are adapted to the normalization values determined in the preparation step, and/or that, in the adaptation step, the weight ranges are adapted to the normalization values determined in the preparation step. The present method is configured as an adaptive method, so that each newly determined dimension and/or each newly determined article weight contributes to the respective dimension and/or weight ranges.

According to an advancement, it is provided that for each dimension range and/or each weight range, the confidence value is determined from a scattering of the normalization value, and/or that the confidence value is determined from the number of preparation steps performed. This advancement makes it possible to state how well the individual determined value ranges reflect the actually occurring determined dimension and/or weight values. An only very low scatter of the determined values will result in a high confidence value as that means that the normalization values are also subjected to only very low fluctuations. For example, in case of an article's outer packaging having very unclear outer dimensions, at least one article boundary may not be clearly determinable in the image processing step, leading to a greater scatter of the determined values. In such a case, the confidence value will be low, as well. Keeping to the example of dimensions, it is also possible that only one dimension component is hard to capture while others can be captured well. Since, according to the present embodiment, the confidence value is determined for each weight range, the scattering dimension component and with that, the allocated dimension range, will have a low confidence value, while a different component along with the allocated dimension range will have a higher confidence value. Furthermore, the number of the preparation steps performed also influences the confidence value. An increasing number of preparation steps performed (with low scatter) also leads to increasing certainty that the determined normalization value reflects the real conditions. This means that, in the case of low-scatter measurement values, the confidence value will increase but, conversely, also that high-scatter measurement values cause the confidence value to decrease.

According to an advancement, it is provided that, when forming the normalization and confidence value, a window function is applied, in each case, to the determined dimensions and article weights. Using a window function, the number of the measurement values considered in the preparation step is limited and thus, a sliding determination of the normalization and confidence values is achieved. The window width allows adjusting the sensitivity of the method, and in particular, it effectively influences the response time to changing article parameters. The smaller the selected size of the window, the faster the present method responds to changing measurement values, and it can thus adapt early, for example, to a changed outer packaging and/or to a changed content quantity (for example, if a manufacturer rolls out promotional articles using the same article number).

According to an advancement, it is also provided that the article reference data is transmitted, by means of a superordinate warehouse management system (WMS), to the preparation and analysis system, where it is stored in a storage means. As the entire management of the articles to be picked takes place in the superordinate warehouse management system, it is advantageous if the WMS also transmits the initial article reference data set to the preparation and analysis system because this saves work steps and avoids sources of error. In any case, the article reference data set comprises an unambiguous article identification, for example an article number of the WMS or an article-specific code such as an EAN. The data will furthermore contain characteristic and/or essential dimension data, for example length, width, height in the case of cuboidal outer packagings and/or of the smallest enveloping cuboid. Characteristic dimensions are those dimensions which will be preferably optically detectable when the article is arranged in or on the first load carrier. Moreover, the weight may also be stored in the article reference data set. The characteristic dimensions and the weight are captured mostly manually at the article receipt area and entered into the WMS.

An advantageous advancement also consists in that, when article reference data is missing, a series of article transfers between the first and the second load carriers is executed, and the article parameter field with normalization values and confidence values for dimensions and/or article weights is created from the respectively determined dimensions and/or article weights. Article reference data, including an unambiguous article identification, is mostly provided by a warehouse management system (WMS). However, with the present advancement, it is also possible to start creating one's own article parameters without initial data from the WMS. For this purpose, the robot is controlled to pick-up an article from or out of the first load carrier and to transfer the article into the second load carrier. The method steps according to the invention are performed, during the preparation step, the article parameter field is created and stored in the parameter field. In particular, the dimension ranges with the respective normalization and confidence values and/or the weight ranges with the respective normalization and confidence values are created. The transfers are performed a predefined number of times, such that subsequently, a set of article parameters is provided for the further course of the method. Based on a mathematical estimate and/or on empirical data, the number is selected here such that a reliable parameter field can be created. For the transfers it is necessary that the first load carrier contains articles of only one identical type.

For expediting the creating of the parameters, an advancement provides that a fluctuation range is determined from a sequence of normalization or confidence values of the dimensions and/or of the article weights, and the article transfers are stopped when falling below a threshold of the fluctuation range. As suggested, the transfer process may be performed any specific desired number of times. However, it is also possible to check how strongly the normalization value and/or the confidence value changes after each, or after multiple, transfer processes and to stop the transfer process in case of only slight changes. At the start of the transfer process, the normalization values and/or confidence values will change strongly, before then trending towards a value and/or settling down around that value. The longer the method is executed, the smaller the fluctuations will be, meaning that the fluctuation range becomes smaller. According to the present advancement, the transfer may now be stopped when falling below a threshold value of the fluctuation range, as the achieved precision is sufficient for the actual picking process. While picking, the parameters are continuously adapted, in particular improved, in the preparation step.

According to an advancement, it is also provided that a complete transfer is performed and the load carrier is emptied completely. After the transfer, the determined normalization value(s) and the confidence value(s) are analyzed. If, by this transfer process, no sufficiently high data quality could be obtained, which is reflected in an accordingly high confidence value, the initial parameter creating step can be stopped. If necessary, a complete transfer may also consist in a source load carrier being transferred completely into a target load carrier and subsequently, the target load carrier being transferred back into the source load carrier. Moreover, it is also possible that during the transfer, the normalization value(s) and the confidence value(s) are analyzed and the transfer process is reversed upon reaching a sufficient data quality, so that the already transferred articles are moved back into the initial load carrier.

According to an advantageous advancement, it is also provided that in case of a high confidence value for the dimension normalization value or for a weight normalization value, an automated or semi-automated update of the article reference data is executed. Article reference data as provided by the warehouse management system (WMS) may, as already described, deviate from the real dimension and/or weight values, which is often not detected by the article receiving process. Thus, the values (dimensions and/or weight) determined by the present method may no longer correspond with the values provided by the WMS. By means of the present method, however, the respective normalization values will adapt to the newly determined values and as a result, the confidence value will increase. From a threshold value of the confidence value, the normalization values determined by the present method are more reliable than the data from the WMS. In consequence, this particularly also means that the article reference data must be faulty as otherwise, there could be no significant deviation. When automatically updating the article reference data, the article reference data determined by the present method are transmitted directly to the WMS, which then updates the article reference data. When updating in a semi-automated manner, a message is sent to the WMS or to a responsible supervisor, wherein the actual update must be initiated manually.

The object of the invention is also achieved by means of a workstation, in particular a picking station. The workstation comprises a first provisioning position for a first load carrier and a second provisioning position for a second load carrier, a robot with a robot head that is movable with respect to a robot base, the robot head having a gripping unit for transferring articles between the first and second load carriers, an image capturing device and a data processing unit configured for controlling the robot (and possibly a conveying system) and for evaluating data from the image capturing device. It is provided that the data processing unit is configured for executing a present optimization method.

The advantage of this embodiment consists in that a device for executing the present method can be integrated very easily into a picking system. It is particularly advantageous that the present workstation is also suitable for replacing and/or expanding existing picking systems. Thus, existing picking systems, as well, may be expanded by automated picking.

In a possible embodiment, the robot is used at a picking station, and the articles are picked-up from or out of a first load carrier and placed in or on or dropped into or onto a second load carrier by means of the gripping unit, and in doing so, the optimization method according to the invention is executed. However, the robot may also be used at a packing station, where the articles for an order (unrelated to a specific picking order) are picked-up from or out of a first load carrier and placed in or on or dropped into or onto a second load carrier, in the described manner, and in doing so, the optimization method according to the invention is executed. In other words, using the robot at any workstation equipped with a robot is possible in order to execute the optimization method according to the invention. The workstation may comprise a data processing unit configured for controlling the robot (and possibly a conveying system) and furthermore for evaluating data from the image capturing device. On the other hand, the data processing unit may be formed at a central computer unit. The data processing unit serves to execute the optimization method according to the invention.

The provisioning position may be formed by a placing location on a support table or a conveying system for transporting load carriers.

The terms used here are defined below.

Here, a robot is, in particular an articulated-arm and gantry robot. Both systems are configured to position a robot head relative to a robot base within a coordinate space and to execute manipulation actions at the predefined coordinate using a gripping unit arranged on the robot head. The positioning of the robot head in the coordinate space predefined by the mechanical structure of the robot is often executed in a program-guided manner by means of a numerical control system.

An order is electronically acquired as a data set and is processed by the data processing unit. The order is not necessarily to be equated with a picking order but rather, it may also be a repacking order, a replenishment order and the like. A picking order is to be understood as the assembling of requested articles of a customer order. A sales order comprises at least one order. Each order comprises one or multiple order lines. If the order specifies multiple order lines, different articles are needed. In e-commerce, an order quantity is small, so that there is a relatively high number of different orders, each having few order lines. Reference is made to a repacking order when, for example, articles in the article receipt area are to be transferred from a delivery unit (first load carrier) onto or into a second load carrier. Reference is made to a replenishment order when articles are filled onto or into a load carrier.

An article or SKU (stock keeping unit) is the smallest article packaging that can be picked. This unit may consist of a single article or multiple articles which are assembled such that they cannot be separated by picking. It is pointed out that the normalization value and the confidence value for the weight and dimension are fundamentally comparable and allow substantially the same statement. Accordingly, the descriptions of individual advantages generally apply to both value classes, except when explicitly directed to either dimensions or weight.

In the warehouse management system (WMS), characteristic article parameters are preferably acquired in the article receiving process and stored as article reference data in a storage means of the WMS. This article reference data may be transmitted to the present optimization method in the course of a first initialization and for example be stored in a storage means of the preparation and analysis system. The parameters, which are determined by the present method and may deviate, are stored as article parameters, for example in the storage means of the preparation and analysis system.

The preparation and analysis system is to be understood as a control system of the system for executing the present method. In particular, the robot controller is also included thereunder, wherein the robot controller moves the robot head having the gripping unit to a predetermined pose in the coordinate space based on the determined coordinates. The robot controller may be integrated in the preparation and analysis system, although an independent embodiment having a connection via an interface is also possible. For the present invention, the integrated embodiment is intended.

Here, a mathematical scattering measure function is understood to be a mathematical computational model with which (mostly slight) variations in the measurement data acquisition are classified. This particularly serves to achieve that an acquired measurement value can be allocated to an unambiguous data value. The reliability of the allocation can be increased by the iterative application of said scattering measure function.

It should further be noted that the descriptions of mathematical models and/or determination methods can be applied to the handling of determined dimensions and determined article weights unless it is explicitly limited to an application to a determined dimension value or to a determined article weight. It should equally be noted that the present method steps are provided for the handling of both dimension and weight variations unless it is explicitly limited to one option.

Depending on the embodiment of the load carrier, the article may be arranged in the load carrier if it is configured, for example, as a container. In case it is configured as a tray, the article may be arranged on the load carrier. It should be noted that both terms are used synonymously and using in or on the load carrier does not imply a specific configuration of the load carrier.

The dimensions of an article are understood to be the (outer) dimensions of the outer packaging. The outer packaging may be, for example, a carton. In this case the dimensions are the lengths of the corresponding edges. An outer packaging may, however, also be formed by a shrink wrap which adapts to the contour of the article and therefore does not have an even outer contour. In this case, the dimensions may be formed, for example, by linear interpolations of the outer contour. These examples are not an exhaustive account of possible variants of how article dimensions are to be understood.

BRIEF DESCRIPTION OF THE DRAWINGS

For the purpose of better understanding of the invention, it will be elucidated in more detail by means of the figures below.

FIG. 2 shows an embodiment of the system and of the present method for being able to detect and handle variations of the dimensions of the outer packaging;

FIG. 3 shows a representation of value ranges as they are formed by the present method and used for determining distance values and/or number values.

DETAILED DESCRIPTION OF PREFERRED EMBODIMENTS

Figure 1:
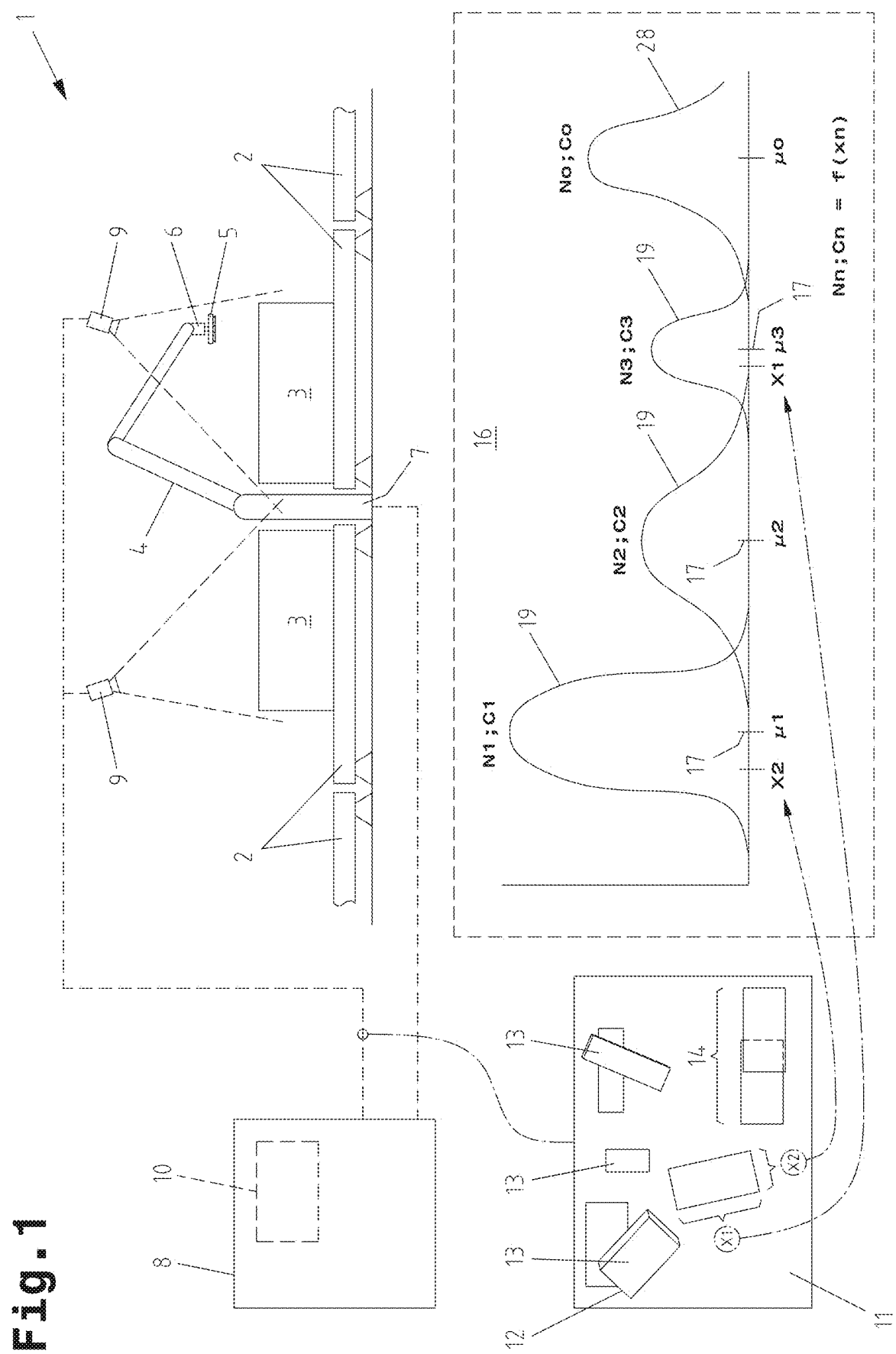
FIG. 1 shows an embodiment of the system and of the present method for being able to detect and handle variations of the dimensions of the outer packaging.

FIG. 1 shows an embodiment of the present method for improving the reliability of a pickup and discharge of articles, in order to be able to detect fluctuations in the dimensions of the outer packaging and to consider them when determining the gripping pose.

At an automated picking location 1, articles are provided, by means of a conveying system 2, in or on load carriers 3. After picking, the load carrier(s) 3 are transported away again by the conveying system 2 and preferably, the next load carrier(s) 3 is/are provided.

The picking location 1 constitutes a possible embodiment of a workstation, which may comprise a provisioning device having one or multiple provisioning positions for one or multiple load carrier(s) 3, a robot 4 with a robot head that is movable with respect to a robot base, the robot head having a gripping unit 5 for transferring articles between the load carriers 3, an image capturing device and a data processing unit configured for controlling the robot (and possibly a conveying system) and for evaluating data from the image capturing device. According to this embodiment, the provisioning device is formed on the conveying system 2 for supplying load carriers 3 and/or transporting load carriers 3 away.

The provision and the transport away are not essential to the present method and are hence not further elaborated on. The load carriers 3, without limiting the specific embodiment, can be formed by containers or trays, for example. The conveying system 2, also without limiting the specific embodiment, can be formed by roller or belt conveyors, for example.

A robot 4 has the gripping unit 5 on a robot head 6, wherein the robot head 6 is movable with respect to a robot base 7 and can be moved by a control unit 8 into any desired gripping position within the movement range of the robot 4. The movement range of the robot comprises in any case the region in which the load carriers 3 (source and target) are provisioned. Thus, the gripping unit 5 can reach every area of the load carriers 3 in order to pick-up or discharge articles there.

For determining the gripping pose, at least the source load carrier 3 is captured in a first step by an image capturing system 9 of an opto-sensory preparation and analysis system 10 of the control unit 8. If the articles to be picked are discharged at the target load carrier 3 at a specific position, a further image capturing system 9 also captures the target load carrier. The image capturing system 9 is preferably configured as a stereo camera system and, apart from an optical image, also captures a point cloud with distance data between the camera system 9 and the surface of the article positioned on the load carrier 3 (and a boundary of the load carrier 3). The captured image 11 as well as the determined point cloud are transmitted to the control unit 8 where they are prepared and evaluated by the opto-sensory preparation and analysis system 10.

FIG. 1 shows a simplified representation of the captured image 11, in particular without the captured boundary of the load carrier 3 and in a vertical view onto the load carrier 3. However, this is insignificant for the descriptive method steps. Image 11 of the load carrier 3 shows a chaotic arrangement of articles 12. Aside from separately arranged articles 12, it will always happen, in particular with load carriers 3 having a high filling degree, that articles 12 are also arranged on top of one another. For the sake of simplification, the perspective representation of articles 12 arranged on top of one another is incomplete.

In order to pick-up the article 12 and securely hold it during the transfer into the target load carrier 3, the gripping unit 5 must pick-up the article 12, more or less, as much in the center of the gripping surface 13 as possible. The gripping unit 5 may, for example, be equipped with gripping fingers or preferably with at least one suction element, wherein it is further of great significance for a reliable pickup that the robot 4 positions the gripping unit 5 as normal to a gripping surface 13 as possible. An advantage of a pickup of the article 12, that is as central as possible, is that the article 12 is then also picked-up near its center of gravity, which is advantageous for securely holding it during the transfer movement. If the article 12 is for example formed by flexible polybags, a pickup that is as central as possible has the further advantage that the article 12 then hangs approximately equally far down on both sides of the gripper, in the direction of the load carrier. During the transfer, the article 12 must be lifted high enough by the robot 4 that it bumps neither into a possibly present boundary of the load carrier 3 not into elements of the picking location 1 during the pivoting movements from the source load carrier to the target load carrier.

By means of an edge recognition method of the opto-sensory preparation and analysis system 10, article boundaries are searched for in the captured image 11 of the load carrier 3, which is possible, for example, by means of a contrast detection method. It may, for example, occur that articles 12 are by chance arranged such that a perceived continuous edge is formed. The contrast detection method would then, for example, recognized the entire length 14 as a dimension and, based on that, would calculate an incorrect gripping pose, with the consequence, it would be highly probable, that the article 12 cannot be picked-up or would come loose from the gripping unit 5 during the transfer. FIG. 1 shows a simplified situation, in which only two articles 12 are located closely together and/or on top of one another. Furthermore, the possibility for delimitation, based on the distance data determined by the image capturing system 9, was not taken into consideration for this description. In a real, chaotically filled load carrier 3, a plurality of articles 12 will be arranged closely together and on top of one another and will also not be reliably distinguishable via distance data (especially in the case of very flat polybags), so that the probability for recognizing a reliable edge length and thus determining an inadmissible gripping pose will increase. Ultimately, such erroneous recognitions will cause the picking performance to drop significantly and/or the error rate will increase.

The safety of recognizing an individual article 12 is increased according to the present method by the determined dimensions being compared with the article reference data which had been acquired during the article receiving process. As already described, these dimensions may fluctuate. For detecting a valid gripping pose—for being able to reliably grip an individual article 12—it is thus necessary to check a determined dimension against stored dimension ranges, meaning an allocation of the stored dimension values to the determined dimensions must take place. As long as the individual dimensions of the outer dimension are clearly different, a comparison with the article reference data will deliver quite good results. Temporary changes of the outer packaging by the producer, using the same article number, cannot be captured with a method based purely on article reference data and will lead to picking errors.

With the present method, the dimensions determined in the image 11 are compared with an adaptively adapted value distribution 16 to be able to thus compensate fluctuations of the dimensions. Measurement values subjected to random fluctuations will in most cases show a normal distribution of the values. A generally cuboid article 12 has three dimension coordinates, wherein the predominant number of the captured dimension values will each be distributed around one of the three dimension normalization values 17. Details on the characteristics of normal distributions are not further elaborated on here, as they are known to a person skilled in the art. As a normal distribution describes a possible distribution function, the general terms normalization value and distribution curve are used in the following, wherein in the special case of a normal distribution, the normalization value corresponds to the mean value.

The edge recognition method of the opto-sensory preparation and analysis system 10 recognized, for example the silhouette of an article 12 and determined two dimension values X1, X2 based thereon. In order to determine which of the three possible dimensions of the outer packaging the determined dimension value X1 is, the determined value X1 is projected onto the value distribution 16. It is evident that the determined value X1 is near the normalization value µ3, 17 and inside the distribution curve N3, 19 belonging to said normalization value µ3, 17.

According to the present method, there is a confidence value C for each distribution curve 19, which confidence value C represents a statistic for how well the normalization value 17 is supported by the distribution curve 19. A more detailed description follows below.

As the determined dimension value X1 is close to the normalization value µ3, 17 and the confidence value C3 for this distribution curve N3, 19 is high, the dimension value is equated with the normalization value µ3, 17.

According to the present method, as soon as the confidence value C is above a determinable threshold value, the determined normalization value is selected as a dimension value while below said threshold, the dimension value is selected from the article reference data. As the present method adapts in each case the normalization value and the confidence value in each determination of dimension values, the certainty of having determined the correct dimension values will increase with an increased performance frequency, assuming minimally scattering measurement values. As the article reference data are not updated, a deviation will occur between the article reference data and the normalization values if the outer packaging is changed as described above by way of example. Due to a possibly high confidence value, however, the values determined by the present method are used in this case and as a consequence, the gripping surface size and the gripping pose are correctly determined despite differing article packaging.

Apart from the three dimension ranges having three distribution curves 19, a fourth range having a distribution curve 28 is additionally represented. Values falling within this range cannot be allocated to a real dimension of an article 12 as they can only originate from capturing errors or an inadmissible article mistakenly located in/on the load carrier 3. In this case, the image processing step is preferably executed again in a special handling. If such erroneous detections occur frequently, it could indicate information that articles of this type should possibly be arranged differently in the load carrier 3 in order to avoid capturing errors.

For reliably processing an order, it is further required, in addition to a reliable pickup and discharge of articles 12, that the correct number of articles 12 is transferred. According to a further embodiment of the present method shown in FIG. 2, the weight of the article 12 picked-up by the gripping unit 5 is evaluated for determining the number of picked-up articles 12.

The difference between the picking location 1 and the picking location described in FIG. 1 is that in the region of the source load carrier 3, a weighing device 20 is arranged. The weighing device 20 can also be arranged in the region of the target load carrier 3 or also on the robot head 6. The arrangement in the region of the source load carrier 3 has the advantage that a determination of the number of picked-up articles 12 can be executed immediately after article pickup, in particular before the robot arm 21 moves in the direction of the target load carrier 3. This enables an early correction of an erroneous pickup, for example when more articles 12 are picked-up than are required for fulfilling the order. A pickup of multiple articles 12 is admissible, however, as long as this does not cause the total number of articles 12 to be picked to be exceeded.

Due to a surface that is difficult for image analysis (for example glossy and/or high contrasts), it is possible that the gripping pose was not optimally determined and the gripping unit is positioned close to the edge of the article 12, for example. When picking-up articles 12, it can thus happen that multiple articles 12 are picked-up. The weight change of the source load carrier 3 is detected by the weighing device 20 and evaluated with the aid of the present method, in order to determine the reliable number of picked-up articles 12.

Just like the outer dimensions, the article weight may also be subject to slight fluctuations, or, as already described regarding the outer packaging, be temporarily changed by the producer. The fundamental problem is thus equivalent to the situation when determining the outer dimension for determining the gripping surface size and/or gripping surface pose, so that this description is not repeated here.

Analogously to the dimensions, the change of weight 22 detected by the weighing device 20 is projected onto the value distribution 23. It is evident that the determined value W1 is near the normalization value µ1, 24, and the weight of the picked-up article 12 is slightly lower than the normalization value µ1, 24. In this case it can be reliably determined, assuming that a confidence value is above the threshold value, that exactly one article 12 was picked-up, and the number value can thus be defined as one.

For example, the weighing device 20 may detect a different weight, which, after projection onto the value distribution 23, falls in the range between the normalization values µ2 and µ3 and is above the normalization value µ2. Again, depending on the confidence value, the number value is defined as two in this case. If at least two articles 12 are still to be transferred according to the order, the control unit 8 will move the robot head 6 to the target load carrier 3 and discharge the articles 12 there. However, if only one article 12 is still to be picked, the control 8 will control the gripping unit 5 to put the picked-up article 12 back into the source load carrier 3. It can possibly be provided that the article 12 is not discharged at the location of the pickup, but rather slightly offset thereto, in order to create a changed and possibly more favorable initial position for the next determination of the gripping position.

FIG. 3 shows a representation of how a determined value (a dimension or a weight) is projected onto the value distribution and the dimension value or the number value is determined thereby. As this classification and allocation method for dimensions and article weight is generally the same procedure, the following description is to be understood for both parameters.

FIG. 3 shows a value distribution 26 with three distribution curves 19, each of which describing the distribution of captured measurement values around a normalization value 17. This value distribution 26 develops adaptively after multiple cycles of the present method as, in the preparation step, a scattering measure function is applied for each detected measurement value, and normalization values and confidence values are determined based thereon. In the first cycle of the present method, the value distribution 26 does not exist-only after multiple cycles, and therefore multiple applications of the scattering measure function to the detected measurement values, (stable) normalization values 17 and distribution curves 19 will develop. In particular, with an increasing number of adaptation cycles, the confidence values of the individual normalization values 17 will also increase. However, this is not to say that all confidence values must inevitably increase. For example, a measurement value may scatter strongly despite a great number of preparation steps, causing a wide distribution curve and therefore a low confidence value.

After multiple cycles of the present method, a value distribution 26 represented by way of example will form.

After the determination of a dimension and/or after the determination of an article weight (generally of a measurement value), the present method compares the dimension and/or the article weight with ranges of the value distribution. In particular, the measurement value is projected onto the value ranges, and a range allocation is determined. The value distribution 26 in FIG. 3 shows multiple value ranges, which are determined by the adaptive embodiment of the present method.

Around each normalization value 17, there is a region (I, III, V) in which an unambiguous allocation of the measurement value to a normalization value 17 is possible. If the confidence value then also falls above a definable threshold, the normalization value can be allocated to the dimension value and/or the number value.

Between the individual distribution curves 19, there are transition and/or overlap regions (II, IV) in which an unambiguous allocation of a distance value and/or a number value is not possible. If the measurement value is inside one of these regions, the present method provides that special handling is performed. For example, as special handling it may be provided that the two neighboring distribution functions are analyzed and a decision is made, in particular, based on the two confidence values, which one of the two normalization values is selected. In simplified terms, the scatter and the number of the measurement values considered into the determination of the confidence value, so that in most cases the normalization value with the higher confidence value is selected. This also results in the asymmetric position of the transition regions. Without considering the confidence value, the allocation border would be exactly at the intersection of the two distribution curves 19 and/or a possible transition region would be significantly wider. By means of the advantageous present method, it is now possible to displace both the position and the width of the transition region in favor of the distribution curve 19 with the higher confidence value. If a past allocation of a normalization value to a measurement value caused, in further consequence, a picking error, the special handling can also take the history of past allocations into account in order to thereby increase the decision quality.

FIG. 3 further shows two edge regions (A, B), which also require an error handling to be executed in case a measurement value is allocated to this region. These regions essentially represent erroneously captured measurement values. The special handling for these cases usually consists in that the image capturing is executed again and/or the article is put back onto the load carrier by the gripping unit. A measurement value in one of these regions may also mean that an unintended article is on the load carrier. In a special handling, a superordinate warehouse management system may be alerted and the load carrier may be transported, by means of the conveying system, to a manual working area.

The illustrated arrangement of the load carriers 3 in relation to the robot 4 is to be understood merely as an example and was selected such particularly for illustrative reasons. In any case, other configurations are also possible.

Ultimately, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, are to be analogously transferred to the new position.

The exemplary embodiments show possible embodiment variants of the invention, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field. Thus, any and all conceivable embodiment variants, which are possible by combining individual details of the embodiment variant shown and described, are also covered by the scope of protection.

Finally, as a matter of form, it should be noted that for ease of understanding of the method steps, drawing elements are partially not depicted to scale and/or are enlarged and/or are reduced in size.

LIST OF REFERENCE NUMBERS 1 picking location
2 conveying system
3 load carrier
4 robot
5 gripping unit
6 robot head
7 robot base
8 control unit
9 image capturing system
10 opto-sensory preparation and analysis system
11 image
12 article
13 gripping surface
14 length
16 value distribution for dimensions
17 normalization value
19 distribution curve
20 weighing device
21 robot arm
22 weight
23 value distribution for article weight 24 normalization value
26 value distribution
28 distribution curve

The invention claimed is:

1. An optimization method for improving the reliability of a pickup and discharge of articles according to an order in a picking process using a robot, wherein the robot has a robot head movable relative to a robot base and comprises a gripping unit, and wherein the picking process comprises the steps of picking up an article having an outer packaging from or out of a first load carrier and placing in or on or dropping into or onto a second load carrier by means of the gripping unit, the method comprising:

performing an image processing step comprising determining a gripping surface size and a gripping surface pose of the article by an opto-sensory preparation and analysis system, and calculating a gripping pose for the gripping unit from the gripping surface size and the gripping surface pose of the article determined by the opto-sensory preparation and analysis system, determining at least one dimension of the outer packaging of the article to provide a determined dimension when the gripping surface size is determined, comparing the determined dimension with dimension ranges stored in an article parameter field and allocating the determined dimension to an allocated dimension range of the dimension ranges, and selecting a dimension value for the allocated dimension range, and allocating the dimension value so selected to the determined dimension, wherein depending on a confidence value of the allocated dimension range, the dimension value is selected from stored article reference data or from a normalization value of the allocated dimension range, wherein the normalization value and the confidence value of the allocated dimension range are stored in the article parameter field, performing a preparation step comprising applying a mathematical scattering measure function for the determined dimension and for the dimension ranges stored in the article parameter field to determine normalization values and confidence values of the dimension ranges, and moving the gripping unit to the gripping pose for the gripping unit calculated in the image processing step to pick-up the article.

2. The optimization method according to claim 1, further comprising a counting step following the pickup of the article by the gripping unit, the counting step comprising determining a numeric quantity of picked-up articles by determining an article weight by means of a weighing device, comparing the article weight with weight ranges stored in the article parameter field, and determining a weight range allocation, and determining a determined number value for the weight range allocation, wherein depending on a confidence value of a weight range from the weight ranges, the determined number value is selected from stored article reference data or from a normalization value of the weight range, wherein the normalization value and the confidence value of the weight range are stored in the article parameter field, and wherein the preparation step further comprises applying the mathematical scattering measure function for the article weight and for the weight ranges stored in the article parameter field to determine normalization values and confidence values of the weight ranges.

3. The optimization method according to claim 2, wherein the weighing device is arranged separately from the robot and acquires the weight of the first load carrier, and the counting step is executed before discharge of the articles.

4. The optimization method according to claim 2, wherein, in case of a determined number value which is greater than one, a check is executed as to whether the determined number value exceeds a target quantity of articles to be picked, wherein the target amount is stored in the order, and in case of exceedance, a special handling step is performed.

5. The optimization method according to claim 4, wherein the special handling step comprises controlling the robot to move the robot head to the first load carrier and to place the picked-up article on or in the first load carrier or to drop the picked-up article onto or into the first load carrier.

6. The optimization method according to claim 2, wherein, in case of exceeding a limit value of the determined number value, or in case of exceeding a range limit value during the determination of the weight range allocation, a special handling step is performed.

7. The optimization method according to claim 2, wherein the normalization value of the weight is calculated by means of a mathematical weighting function from all normalization values of the weight ranges.

8. The optimization method according to claim 2, wherein the mathematical scattering measure function comprises an expectation-maximization algorithm and iteratively groups determined values, dimensions and/or weight values into local clusters.

9. The optimization method according to claim 8, wherein a probability distribution is applied to the grouped values, and wherein for local clusters, a mean value and a mean value scatter are determined and the mean value is defined as the normalization value.

10. The optimization method according to claim 2, wherein the mathematical scattering measure function comprises a sum of weighted normal distributions and iteratively groups values, dimensions and/or weight values into local clusters.

11. The optimization method according to claim 2, further comprising an adaptation step comprising
adapting the dimension ranges to the normalization values determined in the preparation step, and/or
adapting the weight ranges are adapted to the normalization values determined in the preparation step.

12. The optimization method according to claim 2, wherein, for each of the dimension ranges and/or for each of the weight ranges, the confidence value is determined from a scattering of the normalization value, and/or wherein the confidence value is determined from the number of preparation steps performed.

13. The optimization method according to claim 2, wherein, when forming the normalization and confidence value, a window function is applied, in each case, to the determined dimensions and article weights.

14. The optimization method according to claim 2, wherein, when article reference data is missing, a series of article transfers between the first and the second load carriers is executed, and the article parameter field with normalization values and confidence values for dimensions and/or article weights is created from the respectively determined dimensions and/or article weights.

15. The optimization method according to claim 14, wherein a fluctuation range is determined from a series of normalization or confidence values of the dimensions and/or of the article weights, and the article transfers are stopped when falling below a threshold of the fluctuation range.

16. The optimization method according to claim 2, wherein, in case of a high confidence value for the dimension normalization value or for a weight normalization value, an automated or semi-automated update of the article reference data is executed.

17. The optimization method according to claim 1, further comprising a counting step following the pickup of the article by the gripping unit, the counting step comprising determining a numeric quantity of picked-up articles by
  determining an article weight by means of a weighing device,
  calculating a quotient from the article weight determined by the weighing device divided by a normalization value of the weight,
  scaling the quotient to obtain a scaled quotient and comparing the scaled quotient with the weight ranges, and determining a weight range allocation, and
  determining a determined number value for the weight range allocation, wherein depending on a confidence value of a weight range from the weight ranges, the determined number value is selected from stored article reference data or from a normalization value of the weight range, wherein the normalization value and the confidence value of the weight range are stored in the article parameter field, and wherein the preparation step further comprises applying the mathematical scattering measure function for the article weight and for the weight ranges stored in the article parameter field to determine normalization values and confidence values of the weight ranges.

18. The optimization method according to claim 17, wherein a range classification is performed for a decimal value of the quotient, and for a first range, the determined number value is determined by the integer part of the quotient, and for a second range, a special handling is performed.

19. The optimization method according to claim 18, wherein for a third range, the confidence values of two adjoining weight ranges are analyzed, and the article weight is determined from the normalization value of the weight range with a higher confidence value.

20. The optimization method according to claim 1, further comprising checking as to whether the determined dimension is in an overlap region of two dimension ranges, and in the case of the determined dimension being in the overlap region, performing a special handling step to allocate the determined dimension to one of the two dimension ranges.

21. The optimization method according to claim 20, wherein in case of a determined position of the dimension in the overlap region, the image processing step is executed again in the special handling step.

22. The optimization method according to claim 20, wherein in the special handling step comprises controlling the robot to move the robot head to the first load carrier and to pick-up the article and to place the article again, and subsequently, executing the image processing step again.

23. The optimization method according to claim 1, wherein the normalization value is defined as a mean value of a normal distribution.

24. A workstation comprising:
  a first provisioning position for the first load carrier,
  a second provisioning position for the second load carrier,
  the robot having the robot head, wherein the robot head is movable relative to the robot base and comprises the gripping unit for transferring articles between the first and second load carriers,
  an image capturing device, and
  a data processing unit configured for controlling the robot and for evaluating data from the image capturing device,
  wherein the data processing unit is configured for performing the method according to claim 1.

* * * * *

UNITED STATES PATENT AND TRADEMARK OFFICE
CERTIFICATE OF CORRECTION

| | | |
|---|---|---|
| PATENT NO. | : 12,109,700 B2 | |
| APPLICATION NO. | : 17/289887 | |
| DATED | : October 8, 2024 | |
| INVENTOR(S) | : Maximilian Beinhofer et al. | |

It is certified that error appears in the above-identified patent and that said Letters Patent is hereby corrected as shown below:

In the Claims

In Column 20, Line 45 (Line 5 of Claim 11), delete "are adapted"

In Column 22, Line 17 (Line 2 of Claim 22), after "wherein" delete "in"

Signed and Sealed this
Fifth Day of November, 2024

Katherine Kelly Vidal
*Director of the United States Patent and Trademark Office*